(12) United States Patent
Pampinella

(10) Patent No.: US 6,672,139 B2
(45) Date of Patent: Jan. 6, 2004

(54) LEAK TESTING DEVICE AND A COUPLING THEREFOR

(75) Inventor: Joseph A. Pampinella, Great Falls, VA (US)

(73) Assignee: Inflow Products, Inc., Vienna, VA (US)

( * ) Notice: Subject to any disclaimer, the term of this patent is extended or adjusted under 35 U.S.C. 154(b) by 0 days.

(21) Appl. No.: 10/151,893

(22) Filed: May 22, 2002

(65) Prior Publication Data

US 2002/0140222 A1 Oct. 3, 2002

Related U.S. Application Data

(63) Continuation-in-part of application No. 09/845,217, filed on May 1, 2001, now Pat. No. 6,422,064, which is a continuation-in-part of application No. 09/340,438, filed on Jun. 28, 1999, now Pat. No. 6,234,007.

(51) Int. Cl.[7] .............................. G01M 3/04; F16K 3/02; F16L 35/00
(52) U.S. Cl. ............................ 73/49.8; 73/46; 138/89; 138/90; 138/94; 251/319
(58) Field of Search ..................... 73/49.8, 46; 138/89, 138/90, 94; 251/319; 285/93

(56) References Cited

U.S. PATENT DOCUMENTS

| | | |
|---|---|---|
| 1,133,714 A | 3/1915 | Elder |
| 1,928,316 A | 9/1933 | Muto |
| 2,823,887 A | 2/1958 | Osinski |
| 2,953,015 A | 9/1960 | Carrie |
| 3,232,577 A | 2/1966 | Sargent |
| 3,737,180 A * | 6/1973 | Hayes, Jr. et al. .......... 285/197 |
| 3,770,301 A * | 11/1973 | Adams ........................ 285/15 |
| 3,941,349 A | 3/1976 | Pierson ....................... 251/326 |
| 3,945,604 A | 3/1976 | Clarkson |
| 4,019,371 A | 4/1977 | Chaplin et al. |
| 4,176,756 A | 12/1979 | Gellman |
| 4,194,721 A | 3/1980 | Nachtigahl ................... 251/326 |
| 4,407,171 A | 10/1983 | Hasha et al. |
| 4,429,568 A | 2/1984 | Sullivan ..................... 73/49.8 |
| 4,602,504 A | 7/1986 | Barber |
| 4,763,510 A | 8/1988 | Palmer |
| 4,795,197 A | 1/1989 | Kaminski et al. |
| 4,895,181 A | 1/1990 | McKavanagh |
| 5,018,768 A | 5/1991 | Palatchy |
| 5,076,095 A | 12/1991 | Erhardt |
| 5,197,324 A | 3/1993 | Keys |
| 5,269,568 A | 12/1993 | Courturier |
| 5,287,730 A | 2/1994 | Condon ...................... 73/49.8 |
| 5,385,373 A | 1/1995 | Love |
| 5,707,089 A * | 1/1998 | Fend .......................... 285/411 |
| 5,782,499 A | 7/1998 | Gfrerer et al. |
| 6,000,278 A | 12/1999 | Hystad |
| 6,131,441 A | 10/2000 | Berube et al. |
| 6,234,007 B1 | 5/2001 | Pampinella ................. 73/49.8 |
| 6,299,216 B1 | 10/2001 | Thompson |

FOREIGN PATENT DOCUMENTS

| WO | WO 01/01101 | 1/2001 | ................. 73/49.8 |
|---|---|---|---|

* cited by examiner

Primary Examiner—Daniel S. Larkin
(74) Attorney, Agent, or Firm—Dinesh Agarwal, P.C.

(57) ABSTRACT

A leak testing device includes a generally cylindrical sealing gasket which defines a recess therein. The gasket includes first and second end portions for receiving the respective ends of two adjacent conduits. A shoulder portion extends from the gasket. A diaphragm member is positioned in the gasket. A hole is provided in the diaphragm member which can be selectively opened or closed by a valve operably connected to the diaphragm member to thereby permit or restrict the flow of a fluid between the two conduits. A coupling for clamping the leak testing device about one or two conduits includes a generally cylindrical member having a central axis and including a plurality of sections. The sections are interconnected to one another by at least two hinge members in a manner that two sections have free end points to be releasably fastened together.

3 Claims, 13 Drawing Sheets

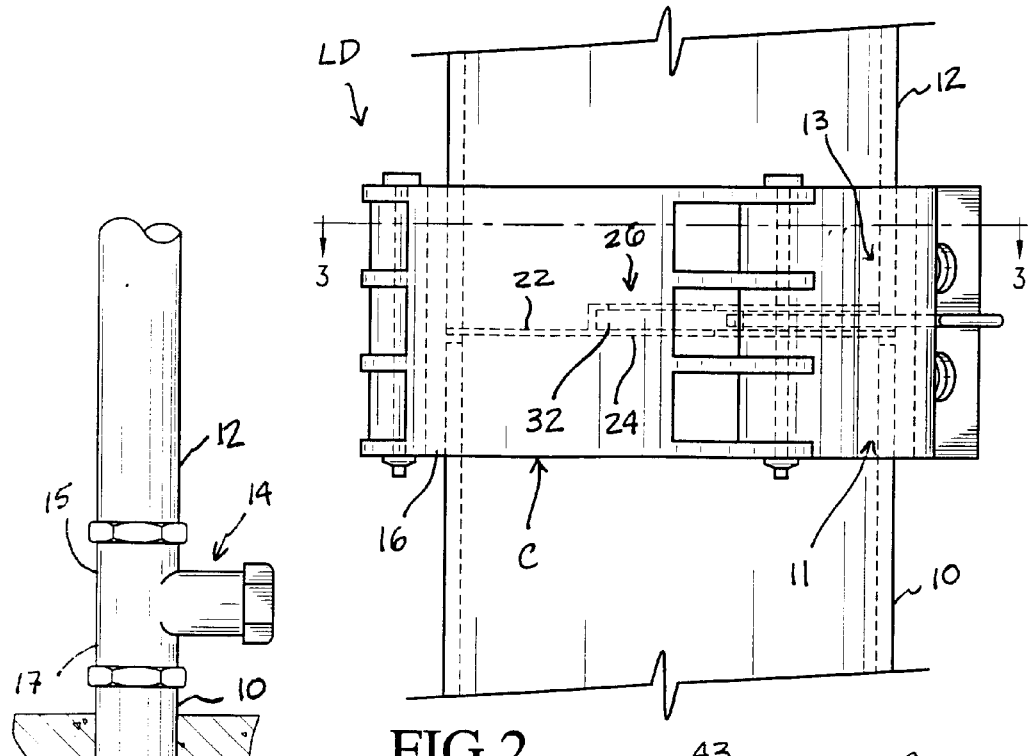
FIG.1 (PRIOR ART)
FIG.2
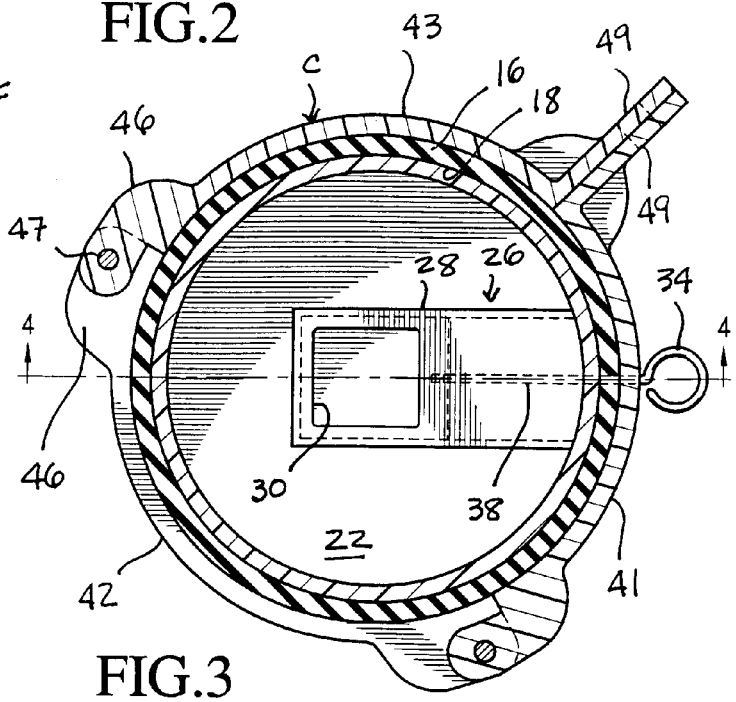
FIG.3

LEAK TESTING DEVICE AND A COUPLING THEREFOR

This is a continuation-in-part of application Ser. No. 09/845,217, filed on May 1, 2001 (now U.S. Pat. No. 6,422,064), which is a continuation-in-part of application Ser. No. 09/340,438, filed on Jun. 28, 1999 (now U.S. Pat. No. 6,234,007), both are incorporated herein in their entirety by reference.

FIELD AND HISTORICAL BACKGROUND OF THE INVENTION

The present invention is directed to a leak testing device to be positioned between two adjacent conduits, or adjacent an end of a single conduit, and a coupling therefor.

In the plumbing industry, it is common to test pipes for leaks prior to use. In particular, in the installation of new plumbing systems in buildings, or the replacement of an existing pipe, the government regulations require that a pipe be leaked-tested prior to its use as part of the overall plumbing system. The current practice is to install a T-fitting between the new pipe and an existing adjacent pipe. The two arms of the T-fitting are vertically connected to the ends of the new and existing pipes with a conventional split-clamp assembly. The side-arm of the T-fitting includes a screw-on cap which can be removed for allowing access to the inside of the T (FIG. 1).

The testing procedure involves a plumbing professional to manually insert a pneumatically inflatable plug through the side-arm of the T-fitting and into the end opening of the new pipe. The plug is then inflated to seal-off the new pipe opening leading into the T-fitting. The new pipe, which in many instance extends to one or more floors of a building, is then filled with a fluid, typically water, and is left in this condition until a government official visually inspects the new pipe for any leaks. Upon completion of the inspection, the fluid from the new pipe must be discharged for final assembly of the plumbing system. The fluid discharge involves deflating the plug by actuating a valve located on the plug which is completely hidden inside the T-fitting. The access to the valve is typically gained through the side-arm of the T-fitting.

The current practice of deflating the plug and removing it from inside the T-fitting is not very desirable in that severe physical injury, including death, or property damage may result if the plug fails for any reason, or due to improper handling thereof. The inflation of the plug to a desired pressure of 30 PSI, and its deflation at the completion of the testing procedure, requires additional equipment and proper training of the associated technician. This procedure further involves the use of a T-fitting which adds to the overall expense of the testing procedure. Finally, in many instances, the inflatable plug weakens or gets damaged due to inflation and deflation and can not be reused.

In view of the above, there has been a need in the industry for a leak testing device which is safe for the plumbing professional and the surrounding property, inexpensive to manufacture, easy to use, and simple in construction. The inventor of the present invention, himself a plumbing professional for many years, responded to this long-felt need and filled the gap in the industry by devising safer leak testing devices disclosed in U.S. application Ser. Nos. 09/845,217, filed May 1, 2001 (presently pending) and 09/340,438, filed Jun. 28, 1999 (now U.S. Pat. No. 6,234,007), the contents of both of which are incorporated herein by reference. The inventor of the present invention also found that conventional couplings were not very effective, cumbersome to use and therefore, not desirable. In particular, a conventional coupling includes a split-clamp and separate upper and lower metallic rings to be disposed about the periphery thereof. Proper positioning and subsequent tightening of the upper and lower rings requires extra time and skill that can be eliminated.

Examples of various valves, pipe testing devices and couplings are disclosed in U.S. Pat. Nos. 1,133,714; 1,928,316; 2,823,887; 2,953,015; 3,232,577; 3,941,349; 3,945,604; 4,019,371; 4,176,756; 4,194,721; 4,407,171; 4,429,568; 4,602,504; 4,763,510; 4,795,197; 4,895,181; 5,018,768; 5,076,095; 5,197,324; 5,269,568; 5,287,730; 5,385,373; 5,782,499; 6,000,278; 6,131,441; 6,299,216; 6,234,007; and PCT International Publication WO 01/01101.

OBJECTS AND SUMMARY OF THE INVENTION

The principal object of the present invention is to provide a leak testing device and a coupling therefor, which do not suffer from the disadvantages of the conventional devices.

An object of the present invention is to provide a leak testing device which can be easily provided between two adjacent conduits, or adjacent an end of a single conduit.

Another object of the present invention is to provide a leak testing device which is safe to use in that it does not threaten physical injury to the plumbing professional, property damage, or damage to others.

Yet another object of the present invention is to provide a leak testing device which eliminates the use of a T-fitting.

An additional object of the present invention is to provide a leak testing device which does not require additional equipment, such as a pneumatic pump or the like for inflation and deflation purposes.

Yet an additional object of the present invention is to provide a leak testing device which is simple in construction, inexpensive to manufacture and is reusable.

An additional object of the present invention is to provide a coupling which can be easily used in connection with a leak testing device provided between two adjacent conduits, or adjacent an end of a single conduit.

Yet an additional object of the present invention is to provide a coupling for use in connection with two adjacent conduits, or a single conduit, which is self-contained and requires significantly less time to install and remove than the conventional couplings.

In summary, the main object of the present invention is to provide a leak testing device and a coupling therefor, which can be easily installed between two adjacent conduits, or adjacent an end of a single conduit. The device and coupling are simple in construction, easy to use and reuse, and do not pose danger of bodily harm to the plumbing professional and associated personnel or risk of property damage, and are inexpensive to manufacture.

In accordance with an aspect of the invention, a conduit coupling includes a generally cylindrical member having a central axis and including a plurality of sections. The sections are interconnected to one another by at least two hinge members in a manner that two of the sections have free end portions to be releasably fastened together. In an alternative embodiment, the conduit coupling includes a shoulder portion adjacent one of the end portions thereof for engaging a diaphragm member.

In accordance with another aspect of the present invention, a leak testing device includes a generally cylindrical sealing gasket which defines a recess therein. The gasket includes first and second end portions for receiving the respective ends of two adjacent conduits. A shoulder portion extends from the gasket. A diaphragm member is provided for positioning within the gasket. In an alternative embodiment, the diaphragm member is made integral with the gasket. A hole is provided in the diaphragm member which can be selectively opened or closed by a valve operably connected to the diaphragm member to thereby permit or restrict the flow of a fluid between the two conduits.

In accordance with another aspect of the invention, a leak testing device includes a generally cylindrical sealing gasket which defines a recess therein. The gasket includes first and second end portions for receiving the respective ends of two adjacent conduits, and a shoulder portion extending into the recess. A diaphragm member is positioned within the gasket and includes a groove for receiving the shoulder portion. A hole is provided in the diaphragm member which can be selectively opened or closed by a valve operably connected to the diaphragm member to thereby permit or restrict the flow of a fluid between the two conduits.

In accordance with another aspect of the invention, a leak testing device includes a generally cylindrical gasket defining a recess therein. The gasket includes a first end portion for receiving an end of a conduit. A diaphragm member is positioned within the gasket and includes a hole. First and second connecting members are provided for interconnecting the gasket and the diaphragm member. A valve is operably connected to the diaphragm member for selectively opening or closing the hole to thereby permit or restrict the flow of a fluid therethrough.

BRIEF DESCRIPTION OF THE DRAWINGS

The above and other objects, advantages and novel features of the present invention will become apparent from the following detailed description of the preferred embodiments of the invention, illustrated in the accompanying drawings, wherein:

FIG. 1 is a partial elevational view of a plumbing system showing a T-fitting installed between two conduits;

FIG. 2 is a partial elevational view showing the leak testing device and the coupling of the invention installed in cooperation with two adjacent conduits;

FIG. 3 is a cross-sectional view taken along line 3—3 of FIG. 2;

DETAILED DESCRIPTION OF THE INVENTION

As illustrated in FIG. 1, the leak testing device LD of the present invention is used in connection with an existing pipe or conduit 10 extending from a floor F or the like, and a new pipe 12. Conventionally, a T-fitting 14 is provided between the existing and new pipes 10 and 12, respectively, prior to testing the new pipe 12 for any leaks. In this regard, it is noted herewith that the leak testing device LD of the present invention can be used with a T-fitting, and preferably without a T-fitting, as shown in FIG. 2.

Figure 4:
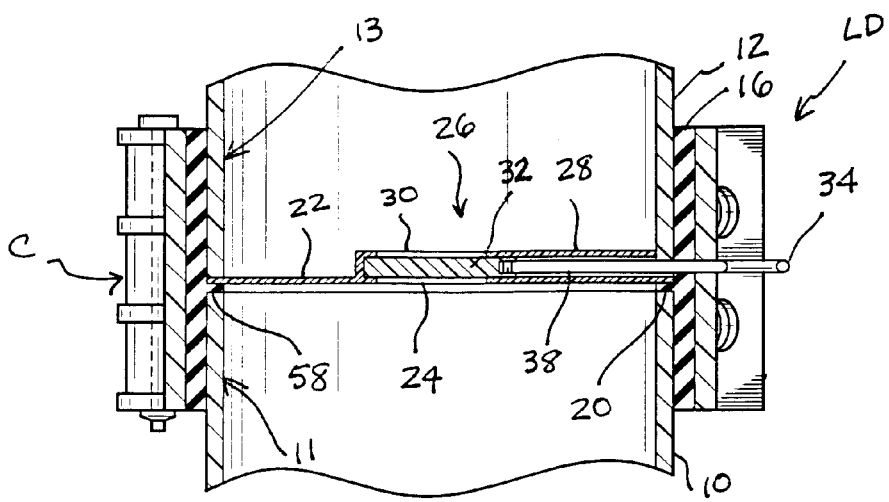
FIG. 4 is a vertical cross-sectional view taking along line 4—4 of FIG. 3.
Figure 5:
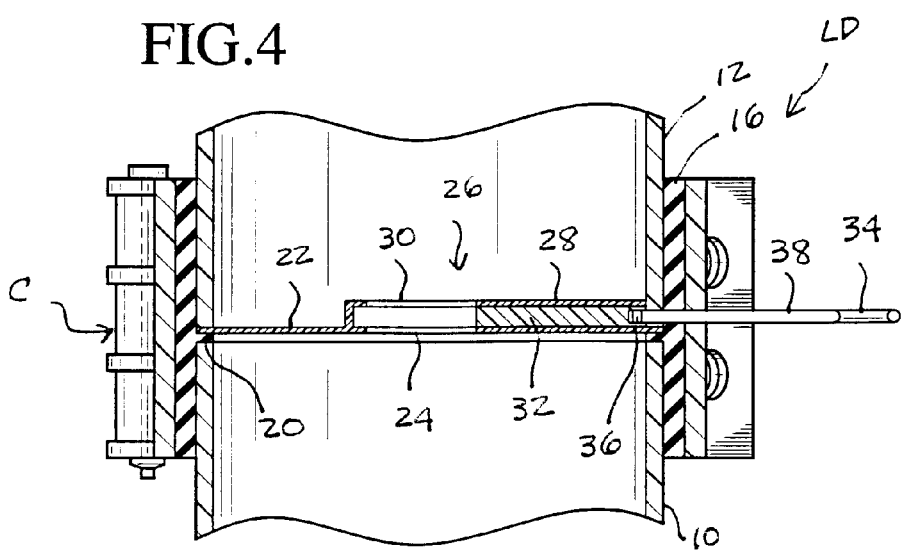
FIG. 5 is a view similar to FIG. 4, showing the valve in an open position.

As best shown in FIG. 3, the leak testing device LD includes a generally cylindrical elongated gasket 16 which defines therein a recess 18. As best illustrated in FIGS. 4–5, a shoulder or lip portion 20 extends radially into the recess 18, and preferably extends throughout the internal perimeter of the gasket 16. In other words, shoulder portion 20 is in the form of an internal ring that extends radially into the recess 18. A substantially circular diaphragm member 22, with a central hole 24, is provided so as to rest on the shoulder portion 20. Preferably, the gasket 16 is made of a resilient or compressible material, and the diaphragm member 22 is made of a generally rigid, yet somewhat flexible material. The diameter of the diaphragm member 22 substantially corresponds to the recess 18 in order to provide a fluid-tight engagement therebetween.

As best shown in FIGS. 2–5, the diaphragm member 22 includes a valve assembly 26. Preferably, the valve assembly 26 includes a valve chamber 28 integral with the diaphragm member 22. The valve chamber 28 includes an upper opening 30 which is in vertical alignment with the hole 24 in the diaphragm member 22. A manually actuable valve member 32 slides within the chamber 28 between a closed position (FIGS. 2–4) and an open position (FIG. 5). The dimensions of the valve member 32 are selected so as to substantially correspond to the dimensions of the valve chamber 28, so that when the valve member 32 is in the closed position (FIGS. 2–4), the flow of fluid between the conduits 12 and 10 is restricted. Likewise, when the valve member 32 is in the open position (FIG. 5), the fluid flows between the conduits 12 and 10, through the upper opening 30, valve chamber 28 and the hole 24. In order to facilitate the opening and closing of the valve member 32, a manually actuable valve handle 34 is detachably connected to the valve member 32. Preferably, interlocking screw-threads 36 are provided on the valve stem 38 and the valve member 32. As can be observed from FIGS. 2–5, the valve stem 38 extends through the gasket 16 for being detachably connected to the valve member 32.

Figure 14:
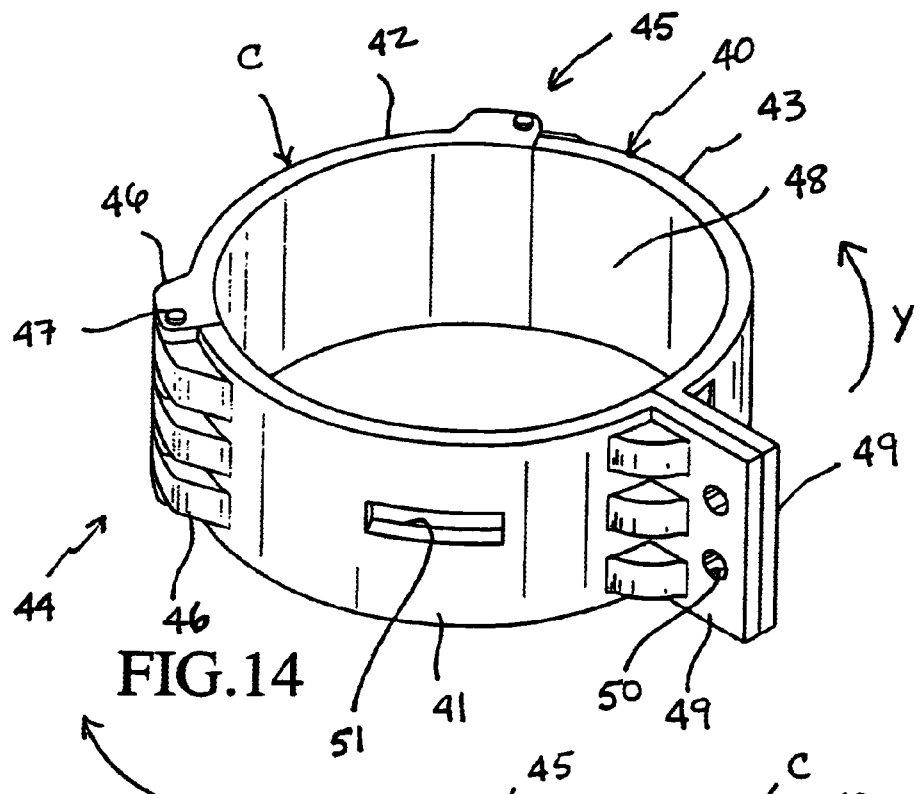
FIG. 14 is a perspective view of the coupling of the invention, shown in use in FIGS. 2–13.
Figure 15:
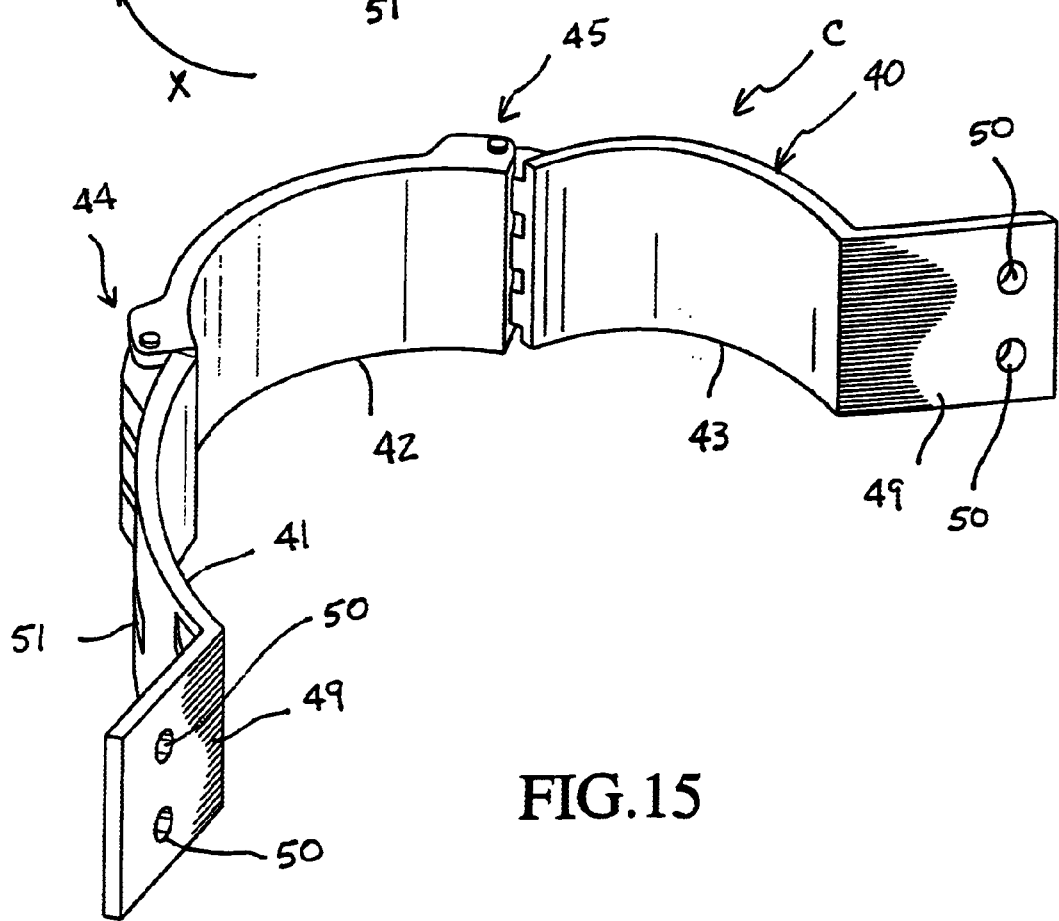
FIG. 15 is a perspective view of the coupling of FIG. 14, shown in an open position.

The leak testing device LD further includes a coupling C (FIGS. 2 and 14–15). As best shown in FIGS. 14–15, the coupling C is in the form of a generally cylindrical member 40 having preferably three generally arcuate or curved sections 41, 42 and 43 that are interconnected by two hinge members 44 and 45. As best shown in FIGS. 3 and 14, each hinge member 44 and 45 includes vertically interleaving fingers 46 pivotally connected together by a pin 47. Preferably, the fingers 46 and the pin 47 are disposed externally of coupling C to provide a substantially unobstructed interior surface 48 for easy insertion and removal of gasket 16.

As best shown in FIG. 15, each section 41 and 43 includes, preferably an integral clamping tab 49 with cooperating holes 50 to receive screws or other conventional fasteners (not shown) therein. The section 41 includes a slot 51 for inserting the valve stem 38 therethrough. (It is noted that the shape of the slot 51 could be varied, for example, to be round, or its size made smaller or larger depending upon the type of valve stem/handle used. For instance, valve stem 38 in FIGS. 2–6 has the configuration of a round pin. Therefore, slot 51 would be made round with a diameter to frictionally accommodate the valve stem 38. On the other hand, valve stem/handle 76 shown in, for example, FIGS. 7–13 has a generally rectangular cross-section. Therefore, the slot 51 shown in FIG. 14 has a corresponding rectangular configuration.)

Figure 15A:
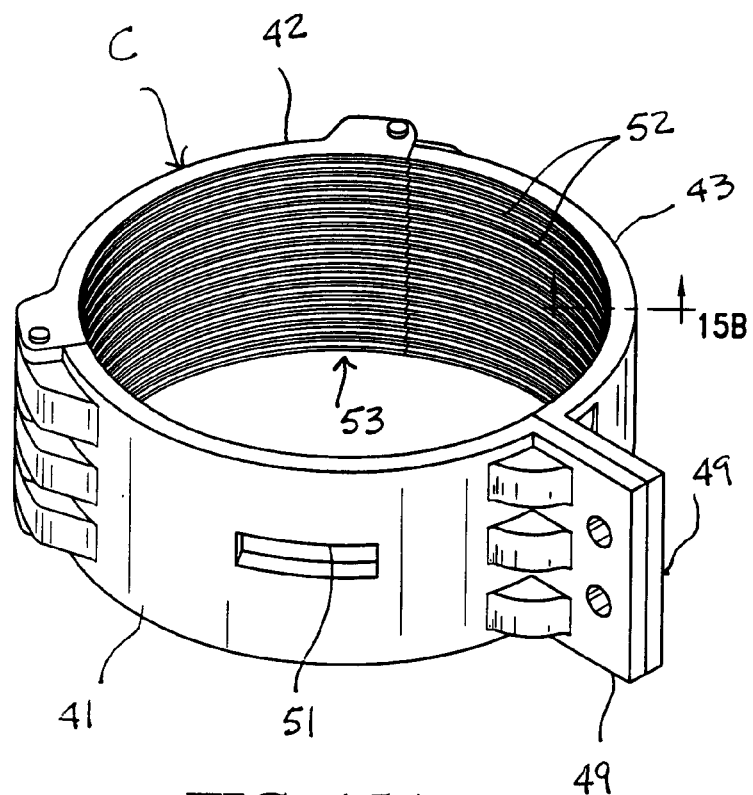
FIG. 15A is a perspective view of a first alternative embodiment of the coupling shown in FIG. 14.
Figure 15B:
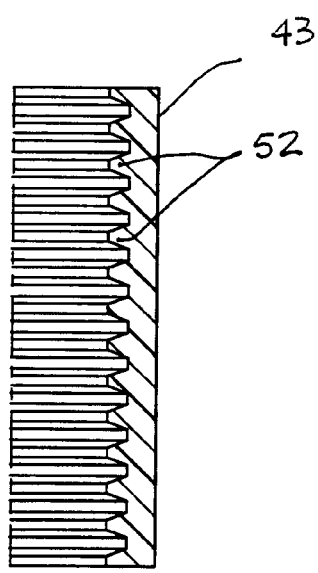
FIG. 15B is a cross-sectional view taken along line 15B—15B of FIG. 15A.

FIGS. 15A–15B illustrate a first alternative embodiment of the coupling C, which is similar to the embodiment shown in FIGS. 14–15, with the exception that ridges 52 are provided on the internal periphery 53 thereof to significantly reduce or eliminate relative movement between the gasket 16 and the coupling C. The ridges 52 are preferably circular and continuous and are arranged vertically. It is noted herewith that the ridges 52 may take the form of radially extending tabs arranged about the internal periphery 53 in generally parallel circles or in other patterns. As best shown in FIG. 15B, the ridges 52 are generally frustoconical in cross-section. Other shapes or configurations, such as generally conical, spherical, semi-spherical, rectangular, or square, or a combination thereof, may also be utilized.

Figure 15C:
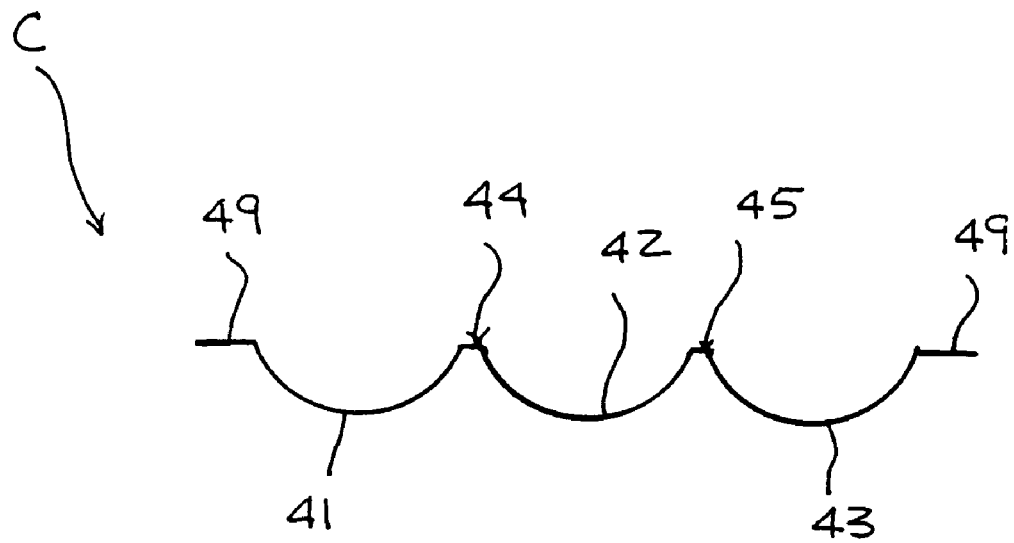
FIGS. 15C and 15D are schematic illustrations showing opening of the coupling.
Figure 15D:
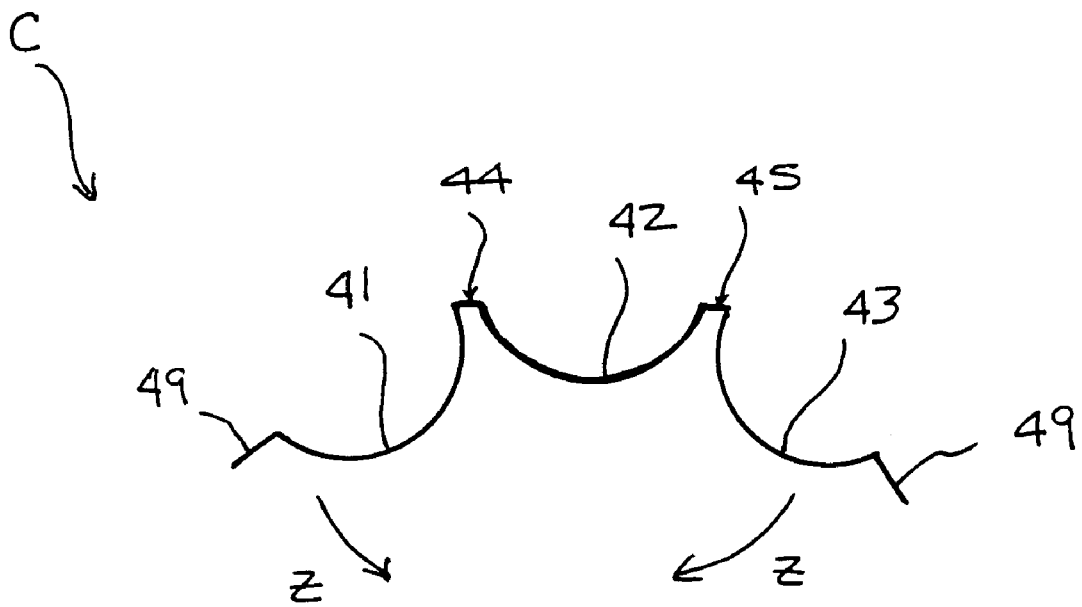

As can be readily seen from FIG. 14, sections 41 and 43, can individually rock or move outwardly away from the other sections about the associated hinge 44 or 45. For instance, section 41 can be moved outwardly about the hinge 44 (see arrow X in FIG. 14). Likewise, section 43 can be moved outwardly about the hinge 45 (see arrow Y in FIG. 14). This construction allows the coupling C to be stretched to an almost linear configuration (see FIG. 15C), without separating the sections 41, 42, and 43 from the hinges 44 and 45, thereby providing the ease of its mounting about conduits. In addition, due to the provision of hinges 44 and 45, coupling C can be stretched even further so that sections 41 and 43 approach each other (see arrows Z in FIG. 15D).

Figure 6:
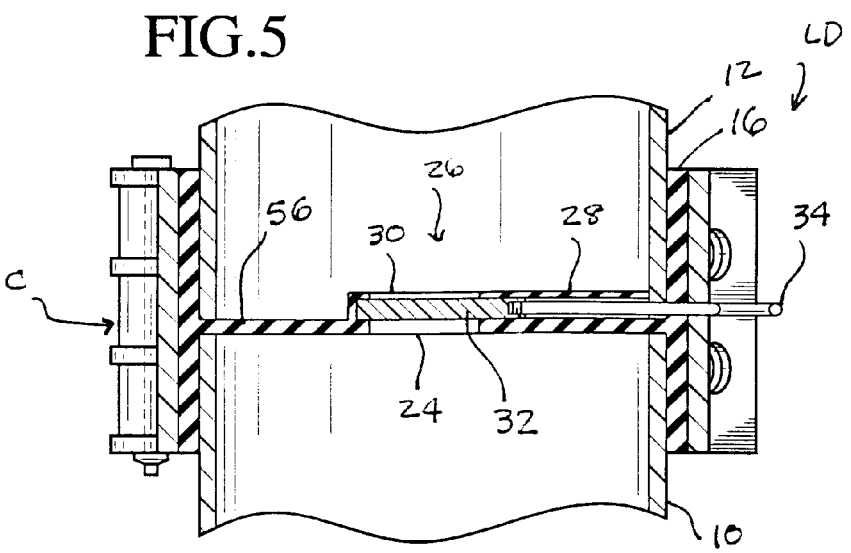
FIG. 6 is a view similar to FIG. 4, showing a first alternative embodiment of the leak testing device.

FIG. 6 illustrates a first alternative embodiment of the leak testing device LD of the invention, which is similar to the embodiment shown in FIGS. 2–5, with the exception that the diaphragm member 56 is integral with the gasket 16. (It is noted herewith that in the alternative embodiment like parts are designated with the same reference numerals as in the embodiment shown in FIGS. 2–5.) Preferably, the diaphragm member 56 is made slightly thicker than the diaphragm member 22, in order to impart sufficient strength to withstand fluid pressure when the new pipe 12 is filled with a fluid.

FIGS. 7–13 illustrate various other embodiments of the leak testing device LD of the invention, wherein like parts are also designated with the same reference numerals as in the embodiments shown above in FIG. 2–6.

Figure 7:
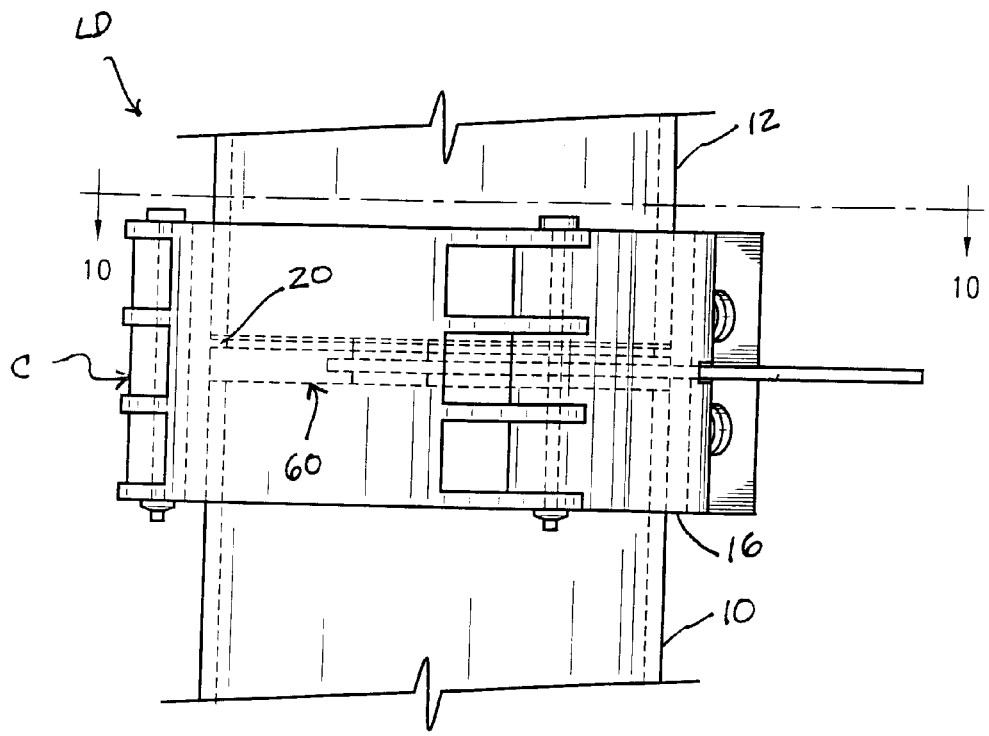
FIG. 7 is a view similar to FIG. 2, showing a second alternative embodiment of the leak testing device.
Figure 8:
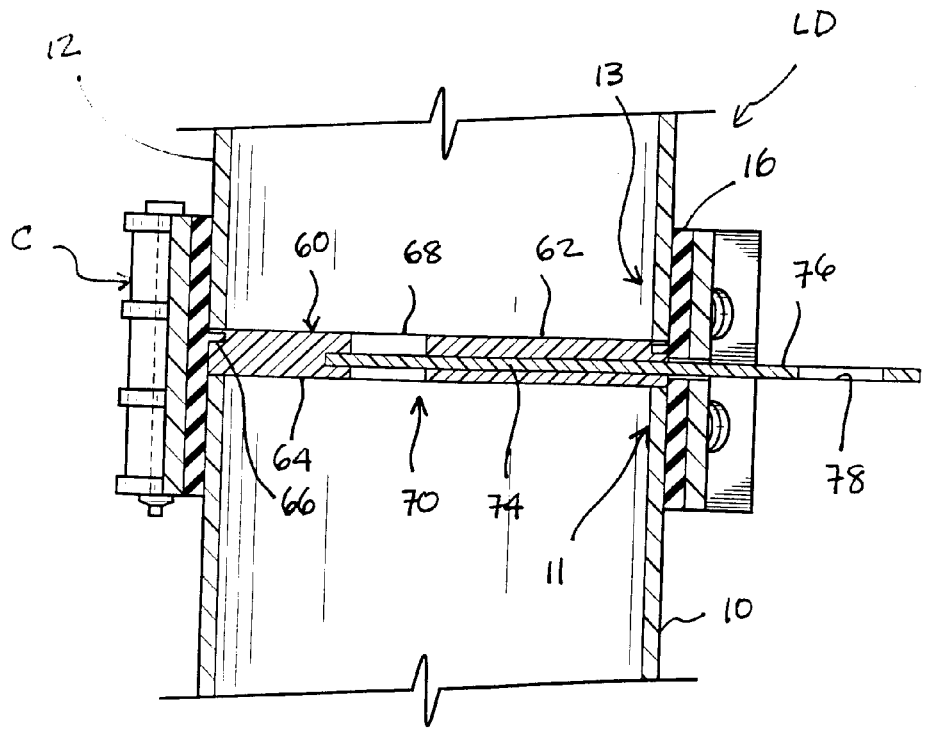
FIG. 8 is a vertical cross-sectional view of FIG. 7.
Figure 9:
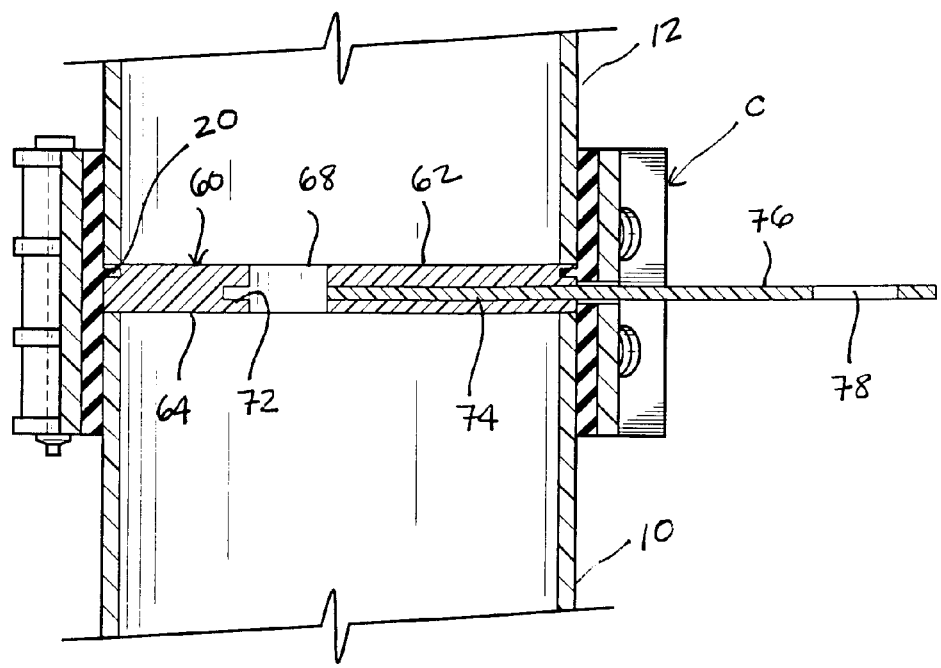
FIG. 9 is a cross-sectional view taken along line 9—9 of FIG. 10, showing the valve in an open position.

Referring now to FIGS. 7–9, the leak testing device LD, according to a second alternative embodiment, is similar to the embodiment shown in FIGS. 2–5, with the exception of the configuration of the diaphragm member 60. As shown, the diaphragm member 60 includes axially spaced surfaces 62 and 64, and a radially inwardly extending groove 66 that is dimensioned to receive the shoulder portion 20 of the gasket 16. Preferably, the groove 66 extends throughout the external perimeter of the diaphragm 60. It is noted herewith that it is not necessary for the shoulder portion 20 to extend throughout the external perimeter of the gasket 16. For example, one or more shoulder portions 20 may be circumferentially spaced about the internal perimeter of the gasket 16. Likewise, one or more corresponding grooves 66 may be provided on the external perimeter of the diaphragm 60 to receive the circumferentially spaced shoulder portions 20.

The diaphragm member 60 is preferably made of a rigid plastic, metal, PVC, or the like material and includes a hole 68. As in the previous embodiments, the diameter of the diaphragm member 60 substantially corresponds to the recess 18 of the gasket 16 in order to provide a fluid-tight engagement therebetween.

Figure 10:
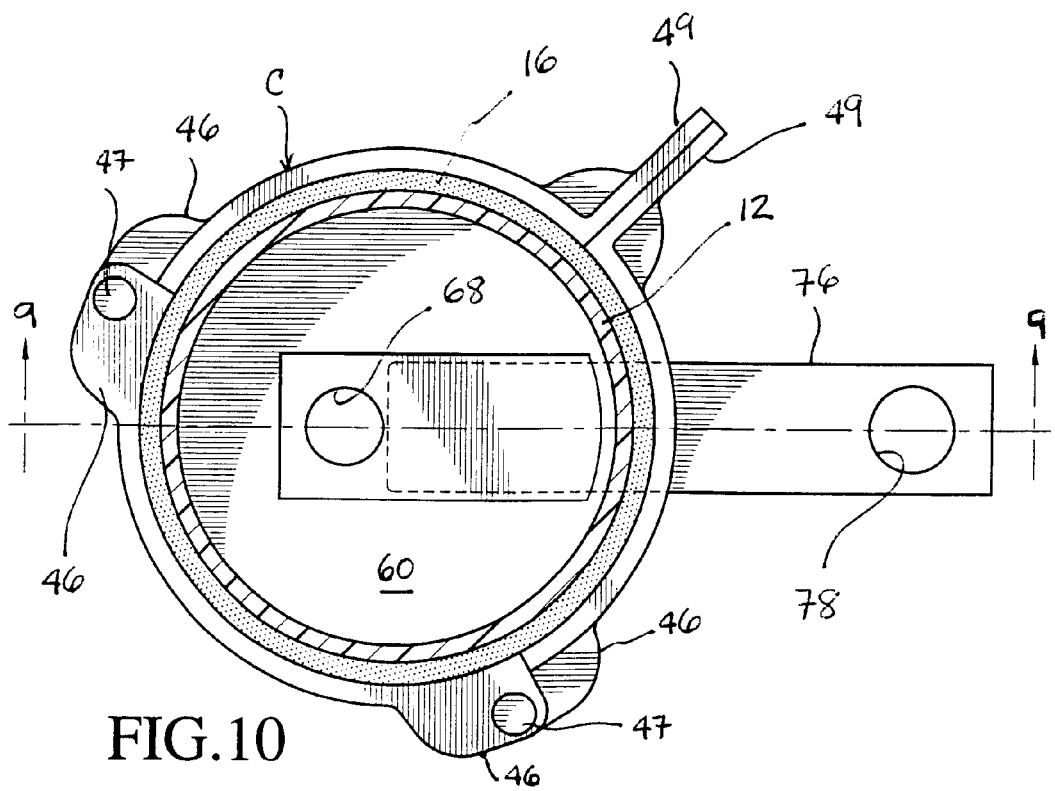
FIG. 10 is a cross-sectional view taken along line 10—10 of FIG. 7, showing the valve in an open position.

As best shown in FIGS. 8–10, a valve assembly 70 includes a radially extending recess 72 in the diaphragm member 60 for receiving a valve member 74 therein. The valve 74 is preferably integral with a valve handle 76 positioned externally of the gasket 16. The recess 72 is in fluid communication with the hole 68. A hole 78 is provided in the valve handle 76 for the ease of holding and actuation thereof.

Preferably, the shoulder portion 20 is axially spaced from the recess 72. In other words, shoulder portion 20 is adjacent diaphragm surface 62 and the valve assembly 70 is adjacent diaphragm surface 64. It is noted herewith that the relative positions of the shoulder portion 20 and the valve assembly 70 could be varied.

Figure 11:
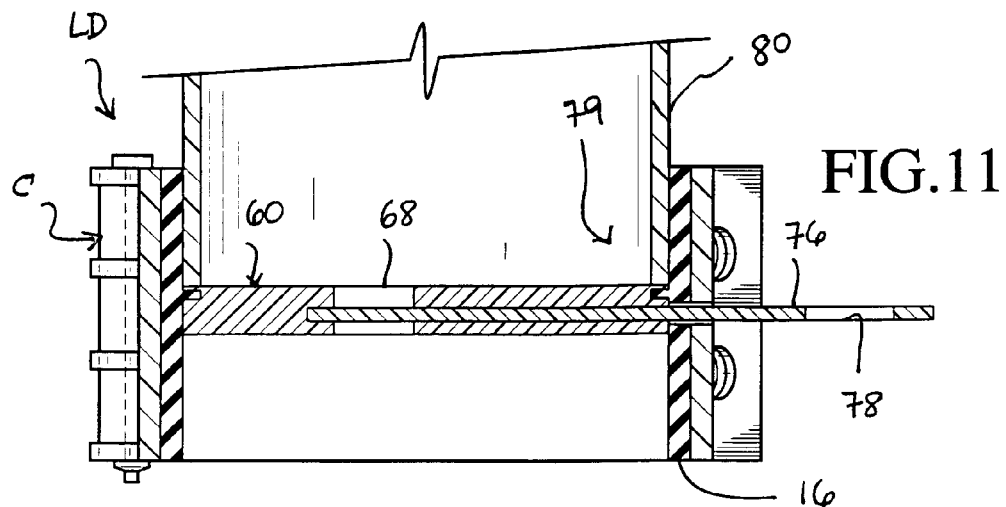
FIG. 11 shows the leak testing device of FIG. 7, installed adjacent an end of a single conduit.

FIG. 11 illustrates the leak testing device LD, shown in FIGS. 7–9, installed adjacent an end 79 of a single conduit 80. This type of arrangement is useful for leak testing a conduit by installing one leak testing device LD of the invention at one or each end thereof.

Figure 12:
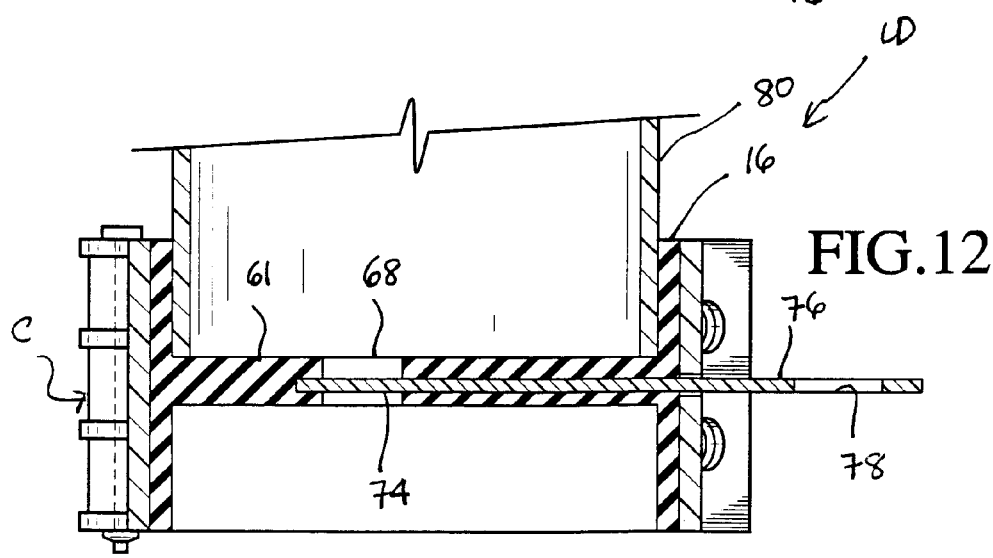
FIG. 12 is a view similar to FIG. 11, showing a third alternative embodiment of the leak testing device installed adjacent an end of a single conduit.

FIG. 12 illustrates a third alternative embodiment similar to that shown in FIG. 11, with the exception that the diaphragm member 61 is integral with the gasket 16.

Figure 13:
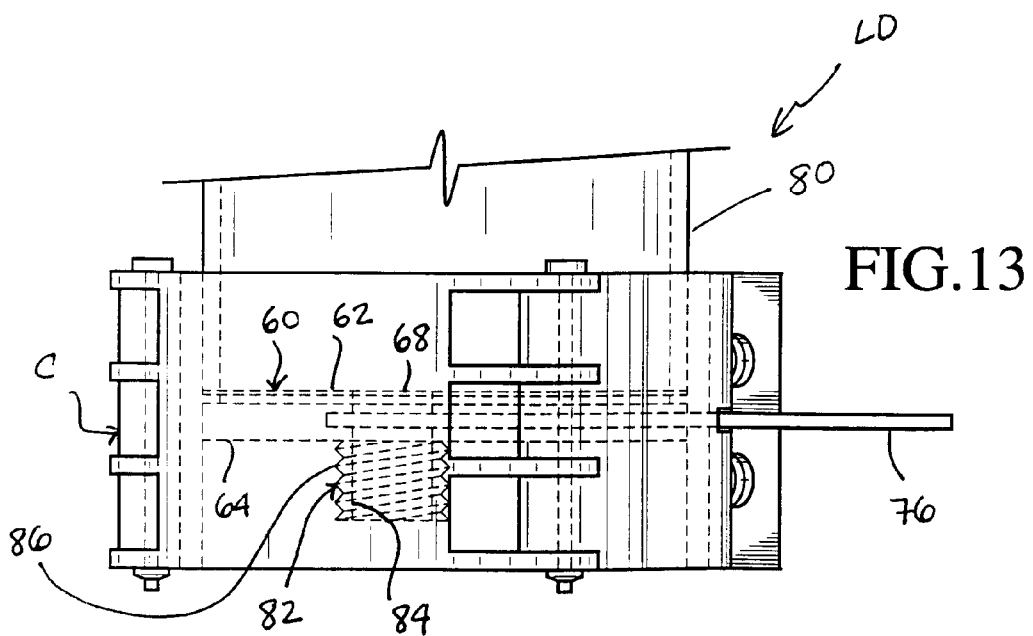
FIG. 13 is a view similar to FIG. 7, showing a fourth alternative embodiment of the leak testing device installed adjacent an end of a single conduit.
Figure 19:
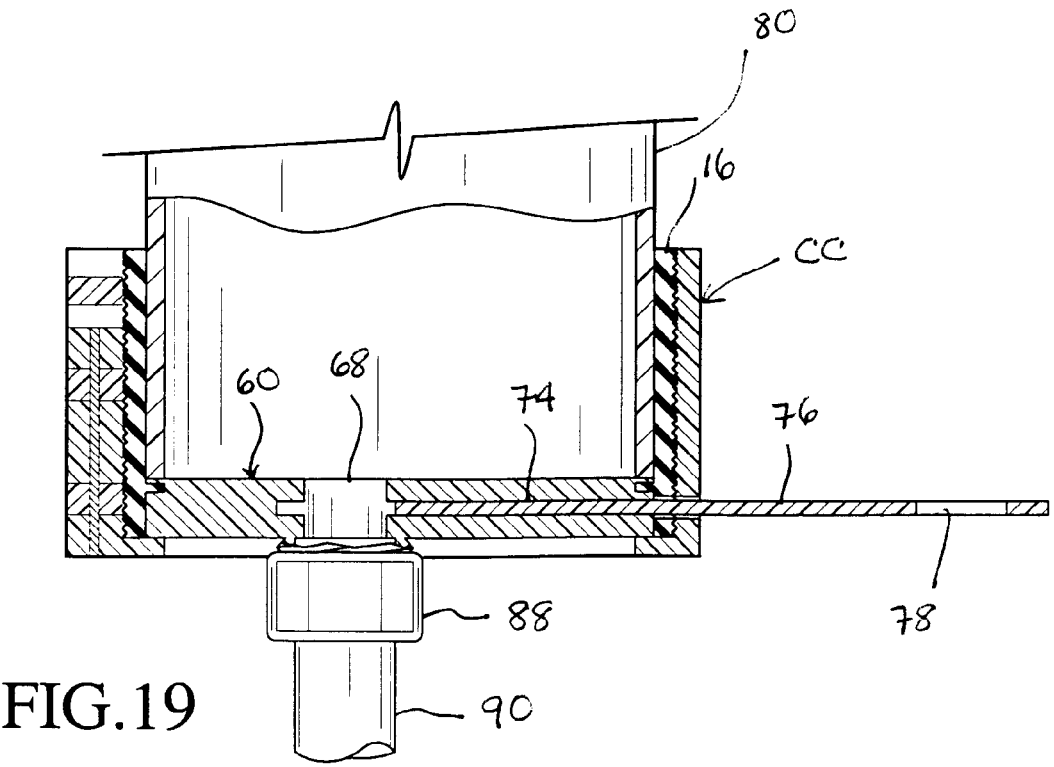
FIG. 19 is a view similar to FIG. 18, showing the valve in an open position and a hose connected to the fluid discharge member.
Figure 20:
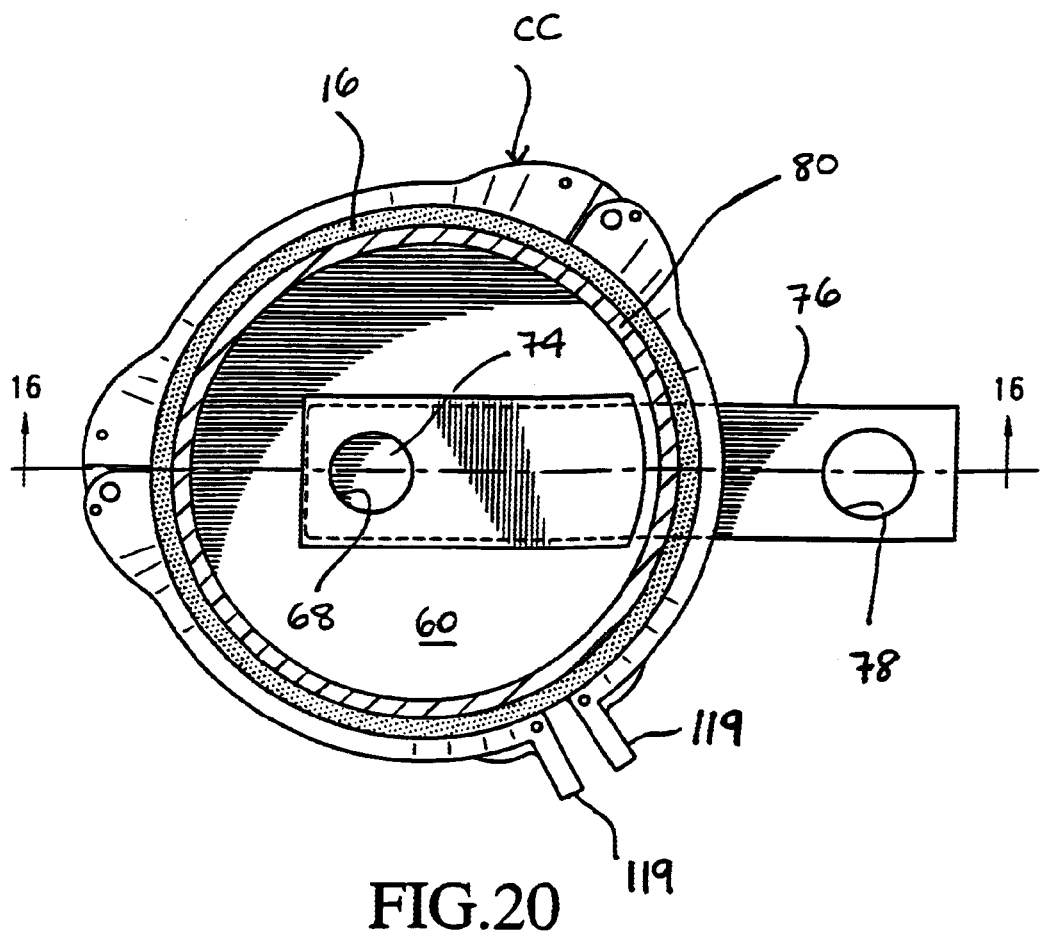
FIG. 20 is a top plan view of the second alternative embodiment of the coupling, shown with the leak testing device of FIG. 7.

Referring now to FIG. 13, showing a fourth alternative embodiment of the leak testing device LD of the invention, which is similar to the embodiment shown in FIG. 11, with the exception that a fluid discharge nipple 82 extends from diaphragm surface 64. The nipple 82 defines an internal passageway 84 that is in fluid communication with the hole 68 and the recess 72. Preferably, the nipple 82 includes external screw-threads 86 for cooperating with the internal screw-threads of, for example, a garden hose coupling 88 (see FIG. 19). As best shown in FIG. 19, the fluid from conduit 80 may be easily discharged through the garden hose 90 by actuating the valve 74.

FIGS. 16–23 illustrate a second alternative embodiment of the coupling CC of the invention.

Figure 21:
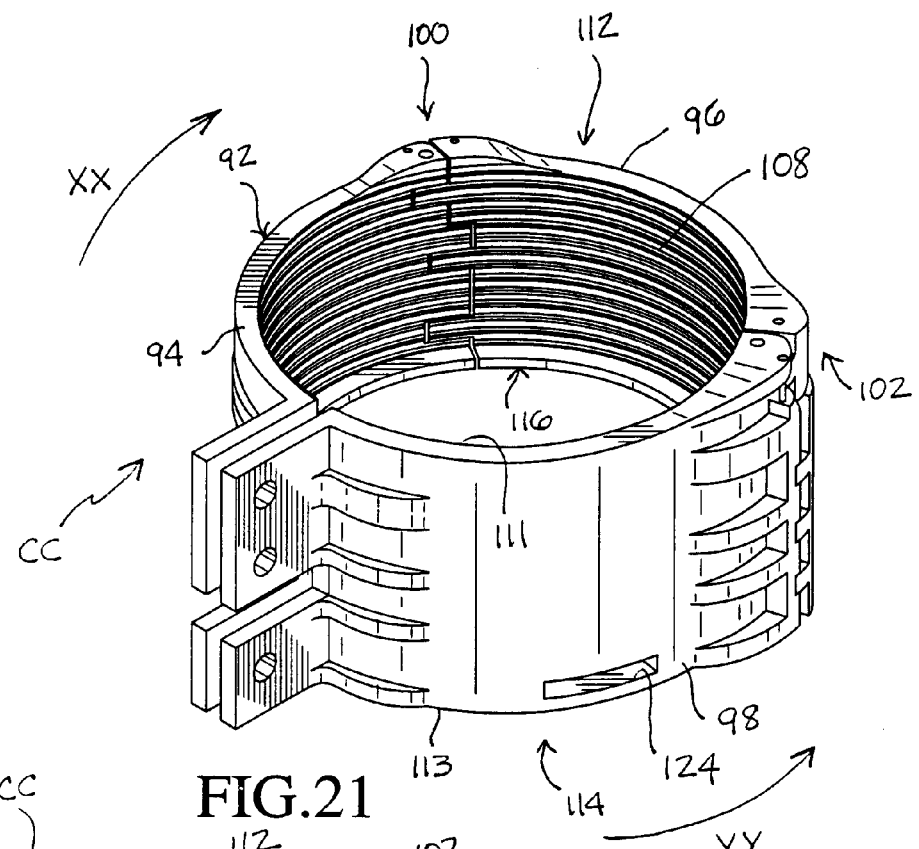
FIG. 21 is a perspective view of the second alternative embodiment of the coupling, shown in use in FIGS. 16–20.
Figure 22:
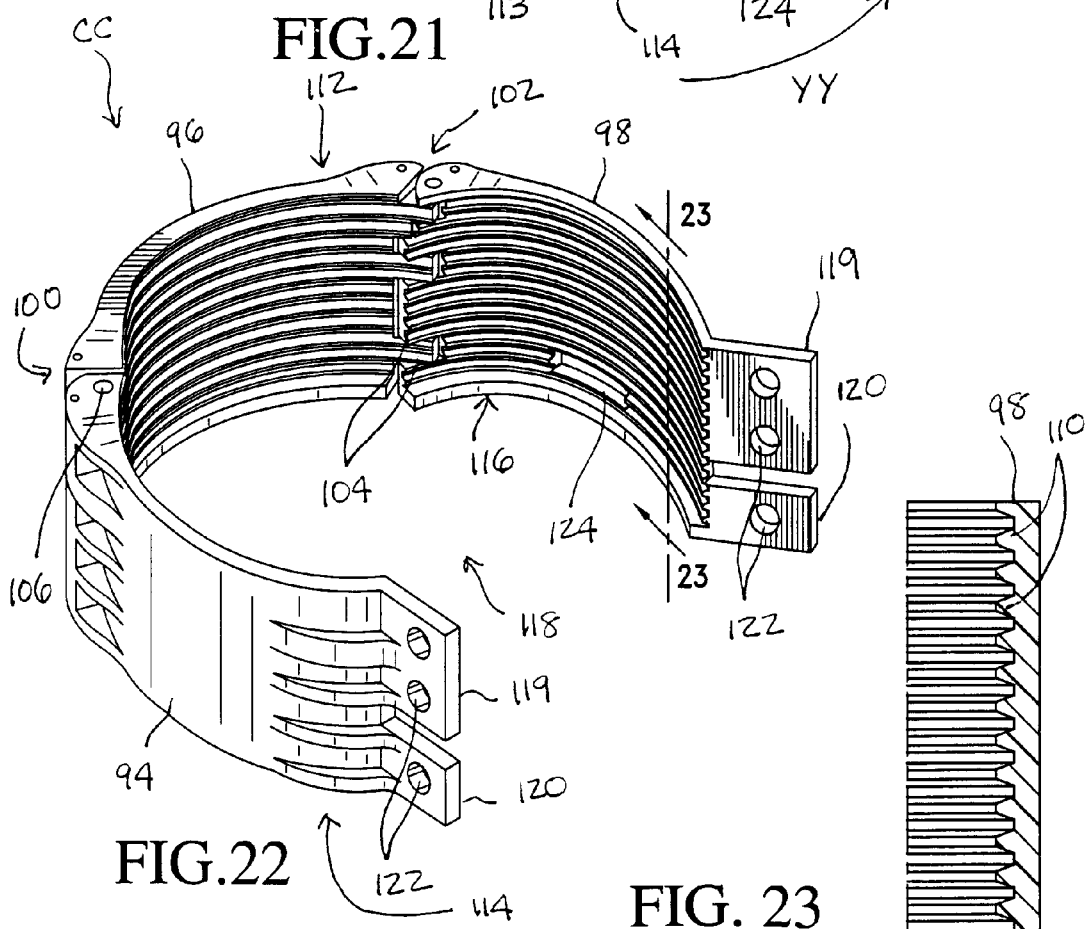
FIG. 22 is a perspective view of the coupling of FIG. 21, shown in an open position.
Figure 23:
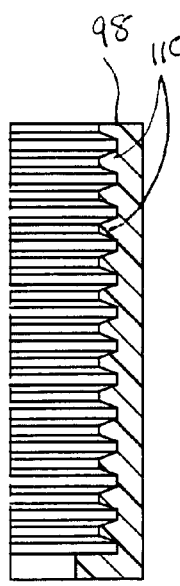
FIG. 23 is a cross-sectional view taken along line 23—23 of FIG. 22.

As best shown in FIGS. 21–22, the coupling CC is in the form of a generally cylindrical member 92 having preferably three generally arcuate or curved sections 94, 96, and 98 that are interconnected by hinge members 100 and 102. Each hinge member 100 and 102 includes vertically interleaving fingers 104 pivotally connected together by a pin 106. Preferably, the fingers 104 are integral with their corresponding sections 94, 96, and 98, so that when the sections are closed together (see FIG. 21), a substantially unobstructed interior surface 108 is rendered for easy insertion and removal of gasket 16.

In order to significantly reduce or eliminate relative movement between the gasket 16 and the coupling CC, the surface 108 is preferably provided with ridges 110 (FIGS. 21–23) that have a similar configuration as shown above in FIGS. 15A–15B with respect to coupling C, and which are arranged in the like manner. The ridges 110 also may have an alternative configuration and a different arrangement pattern as noted above with respect to ridges 52.

Figure 16:
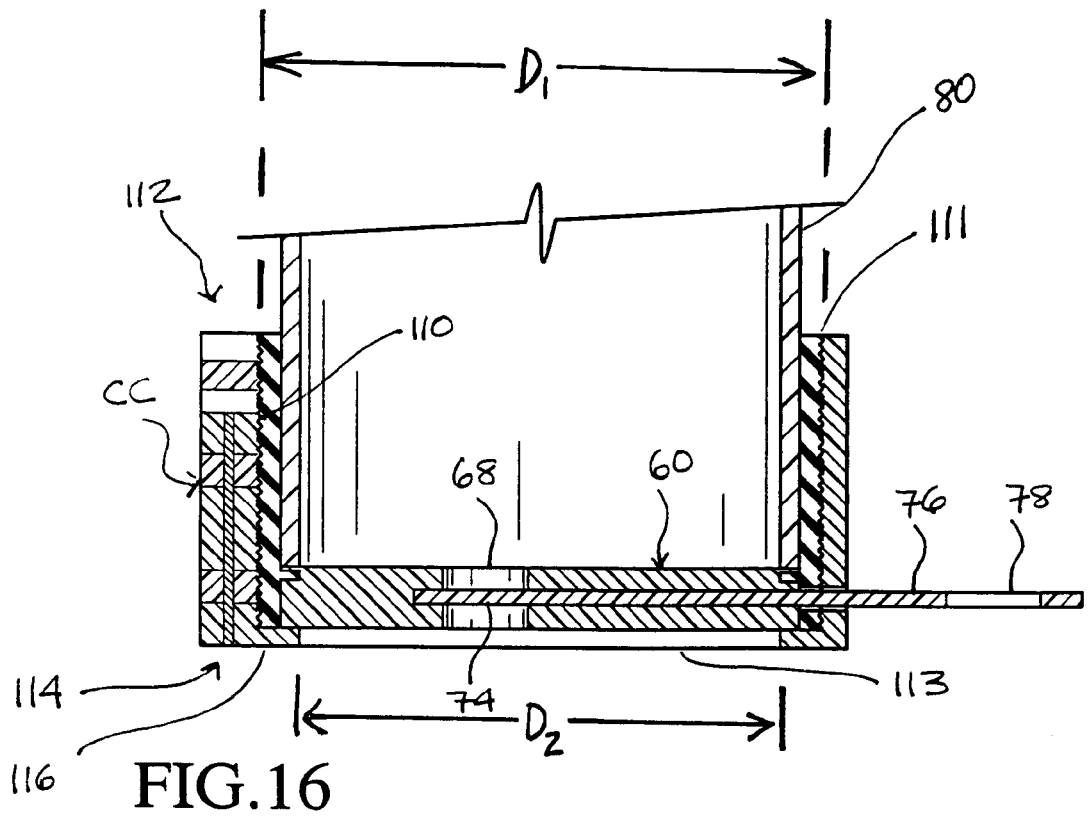
FIG. 16 is a view similar to FIG. 11 (taken along line 16—16 of FIG. 20), showing a second alternative embodiment of the coupling of the invention shown in FIGS. 21–22.
Figure 17:
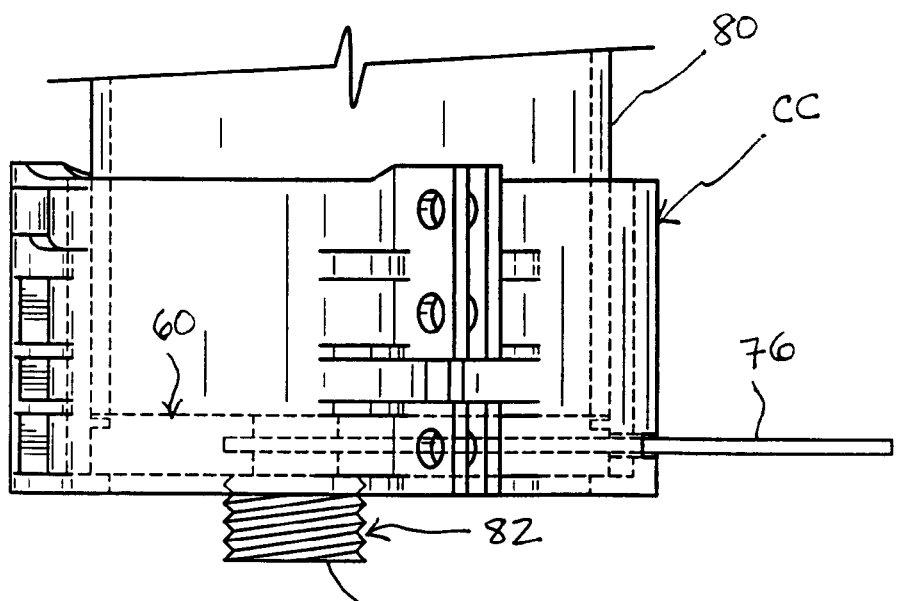
FIG. 17 as a view similar to FIG. 13, showing the second alternative embodiment of the coupling.
Figure 18:
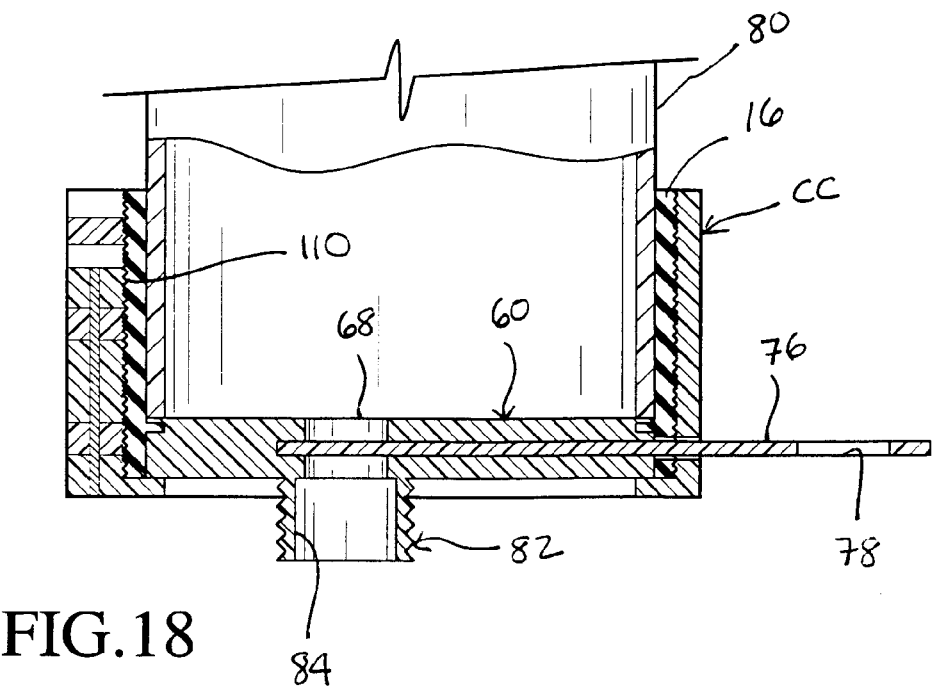
FIG. 18 is a partial, vertical cross-sectional view of FIG. 17, showing the valve in a closed position.

As best shown in FIGS. 16 and 21–22, the coupling CC includes front and rear end portions 112 and 114, respectively. A shoulder portion 116 extends inwardly into the recess 118 of the coupling CC from adjacent the rear end portion 114. The shoulder portion 116 serves as an abutment for the diaphragm 60. The shoulder portion 116 is preferably a circular ring that extends throughout the internal perimeter of coupling CC. (It is noted, however, that shoulder portion may instead include one or more radially extending tabs that are arranged on the internal perimeter of the coupling CC.) The front and rear portions 112 and 114 include front and rear openings 111 and 113, respectively. Since the shoulder portion 116 is substantially flush with the rear opening 113, the diameter $D_1$ of the front opening 111 is larger than the diameter $D_2$ of the rear opening 113 (FIG. 16).

As best shown in FIG. 22, each section 94 and 98 includes, preferably integral upper and lower clamping tabs 119 and 120 with cooperating holes 122 to receive screws or other conventional fasteners (not shown) therein. The section 98 includes a slot 124 for inserting the valve handle 76 therethrough.

As can be readily seen from FIG. 22, sections 94 and 98 can individually rock or move outwardly away from the other sections about the associated hinge 100 or 102, in the same manner as coupling C. For instance, section 94 can be moved outwardly about the hinge 100 (see arrow XX in FIG. 21). Likewise, section 98 can be moved outwardly about the hinge 102 (see arrow YY in FIG. 21). This construction allows the coupling CC to be stretched to an almost linear configuration (in the same manner as coupling C, see FIG. 15C), without separating the sections 94, 96, and 98 from the hinges 100 and 102, thereby providing the ease of its mounting about conduits. In addition, due to the provision of hinges 100 and 102, coupling CC can be stretched even further so that sections 94 and 98 approach each other, in the same manner as coupling C (see FIG. 15D).

FIGS. 16–20 illustrate the coupling CC of the invention in use in connection with a single conduit. In particular, FIGS. 16 and 20, and 17–19, illustrate the coupling CC of the invention in use with the leak testing device LD of the invention shown above in FIGS. 11 and 13, respectively.

Figure 24:
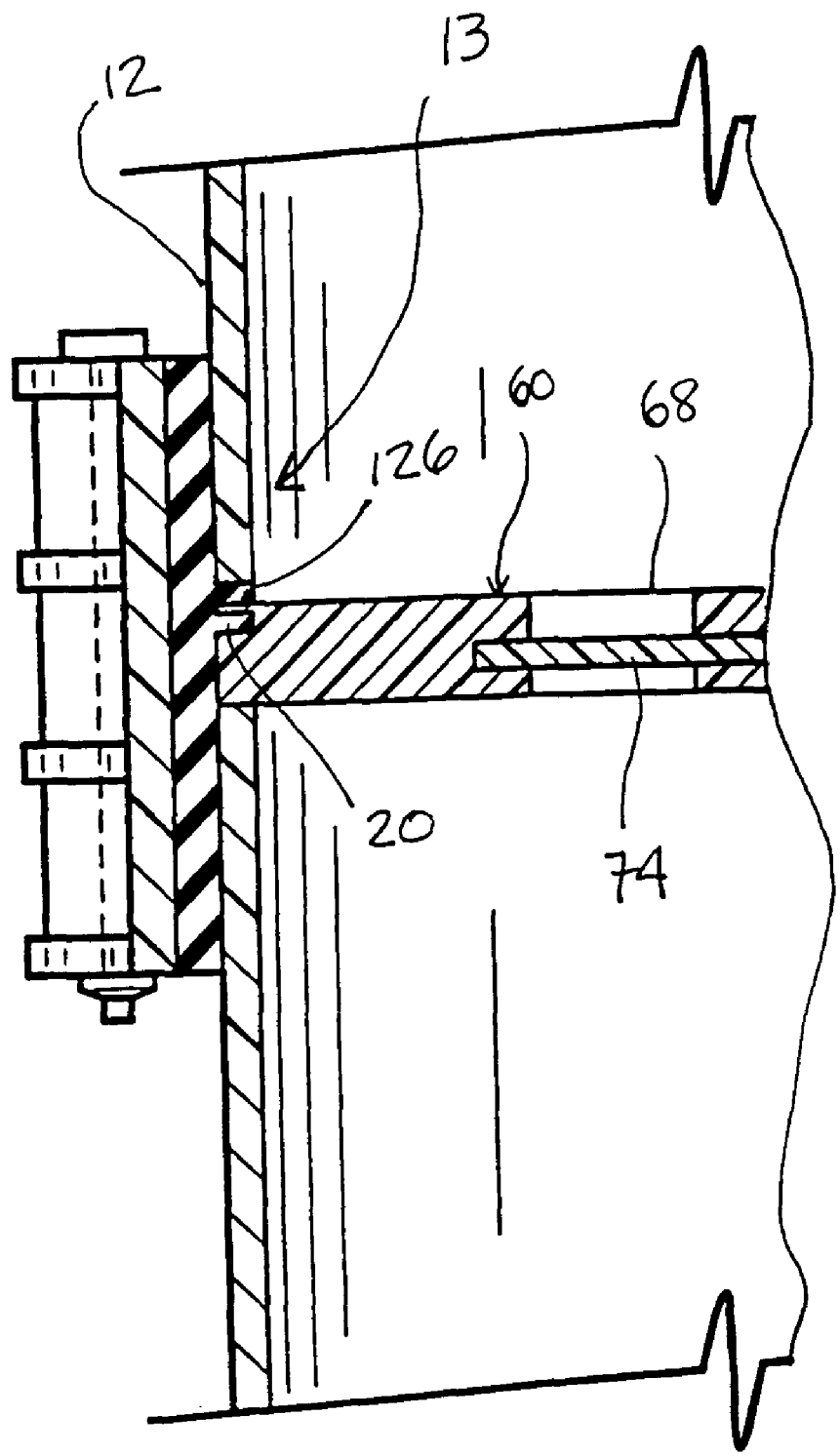
FIG. 24 is a partial enlarged view similar to FIG. 8, showing the provision of a second shoulder portion.

FIG. 24 illustrates the provision of a second shoulder portion 126, generally similar in configuration to shoulder portion 20, for the leak testing embodiments shown in FIGS. 7–13 and 16–20. The shoulder 126 would engage the end portion 13 of pipe 12 for providing a better seal with the diaphragm 60.

Use and Operation

Referring now to FIGS. 1–6, when it is desired to test the leak integrity of a new pipe 12, the leak testing device LD of the present invention is provided such that the respective end portions 11 and 13 of the existing and new pipes 10 and 12 respectively, are slidably received in the recess 18 of gasket 16. As best shown in FIGS. 4–5, the end portion 11 of the pipe 10 would sealingly engage the lower surface 58 of the shoulder portion 20. The end portion 13 of the pipe 12 would come to sealingly engage the diaphragm member 22. The coupling C would then be provided and tightened around the gasket 16, to form a fluid-tight engagement between the leak testing device LD and the end portions 11 and 13 of the pipes 10 and 12. The valve handle 34 would then be actuated to close the hole 24 in the diaphragm member 22 (or 56). Upon assuring that the leak testing device LD is in proper fluid-tight engagement with the pipe end portions 11 and 13, the pipe 12 would then be filled with the fluid and allowed to stand until the inspection for any leaks is completed. Upon completion of the inspection, the valve handle 34 would be carefully and slowly pulled outwardly to allow gradual flow of fluid from the new pipe 12 into the existing pipe 10.

The manner of installation and use of the embodiments shown in FIGS. 7–22, is similar to as described above with reference to FIGS. 1–6. It would be appreciated, however, that the shoulder portion 20 would be snugly received in the groove 66 in a fluid-tight manner, and the end portions 11 and 13 of the pipes 10 and 12, respectively, would sealingly engage the respective surfaces 64 and 62 of the diaphragm member 60. When using the leak testing device of the embodiment shown in FIG. 13, it would be appreciated that the garden hose 90 (or a similar conduit) would be connected to the fluid discharge nipple 82 to allow the fluid from the conduit 80 to flow therethrough to be discharged.

As can be seen from the above, since the opening and closing of the valve assembly 26 (or 70), is done completely external of the pipes 10 and 12, and the fluid flows only between the pipes 10 and 12, the leak testing device LD of the present invention poses no danger to the personnel or the property involved. In addition, the operation of the leak testing device LD of the present invention does not require any additional equipment, such as a pneumatic pump or the like, and thus the entire procedure is straightforward, fast, and significantly less complicated than the conventional devices. Finally, since the leak testing device LD of the present invention does not require the use of a T-fitting, significant savings in terms of time and expense are achieved.

It is noted herewith that in the instances where the installation of a T-fitting is necessary, the leak testing device LD of the invention can be simply used in the same manner as without a T. In particular, the upper arm 15 of the T-fitting 14 would take the place of the existing pipe 10 with the lower arm 17 thereof connected to the existing pipe 10, and the leak testing device LD can be operated in the same manner as described above.

While this invention has been described as having preferred sequences, ranges, steps, materials, or designs, it is understood that it includes further modifications, variations, uses, and/or adaptations thereof following in general the principle of the invention, and including such departures from the present disclosure as those come within the known or customary practice in the art to which the invention pertains, and as may be applied to the central features hereinbeforesetforth, and fall within the scope of the invention and of the limits of the appended claims.

What is claimed is:

1. A leak testing device to be positioned between two adjacent conduits, comprising:
   a) a generally cylindrical gasket defining a recess therein;
   b) said gasket including first and second end portions for receiving the respective ends of two adjacent conduits;
   c) said gasket including a shoulder portion extending into said recess;
   d) a diaphragm member for positioning within said gasket and including a groove for receiving said shoulder portion;
   e) said diaphragm member including a hole;
   f) a valve operably connected to said diaphragm member for selectively opening or closing the hole to thereby permit or restrict the flow of a fluid between the conduits;
   g) a coupling for providing about the perimeter of said gasket to thereby sealingly clamp the device about the ends of the conduits;
   h) said coupling including a generally cylindrical member having a central axis and including a plurality of sections; and
   i) said sections being interconnected to one another by at least two hinge members in a manner that two of said sections have free end portions to be releasably fastened together.

2. The leak testing device of claim 1, wherein:
   a) said sections are hingedly interconnected in a manner that at least one of the two of said sections can rock away from the other sections.

3. The leak testing device of claim 1, wherein:
   a) said cylindrical member includes three sections.

* * * * *